Patented July 25, 1939

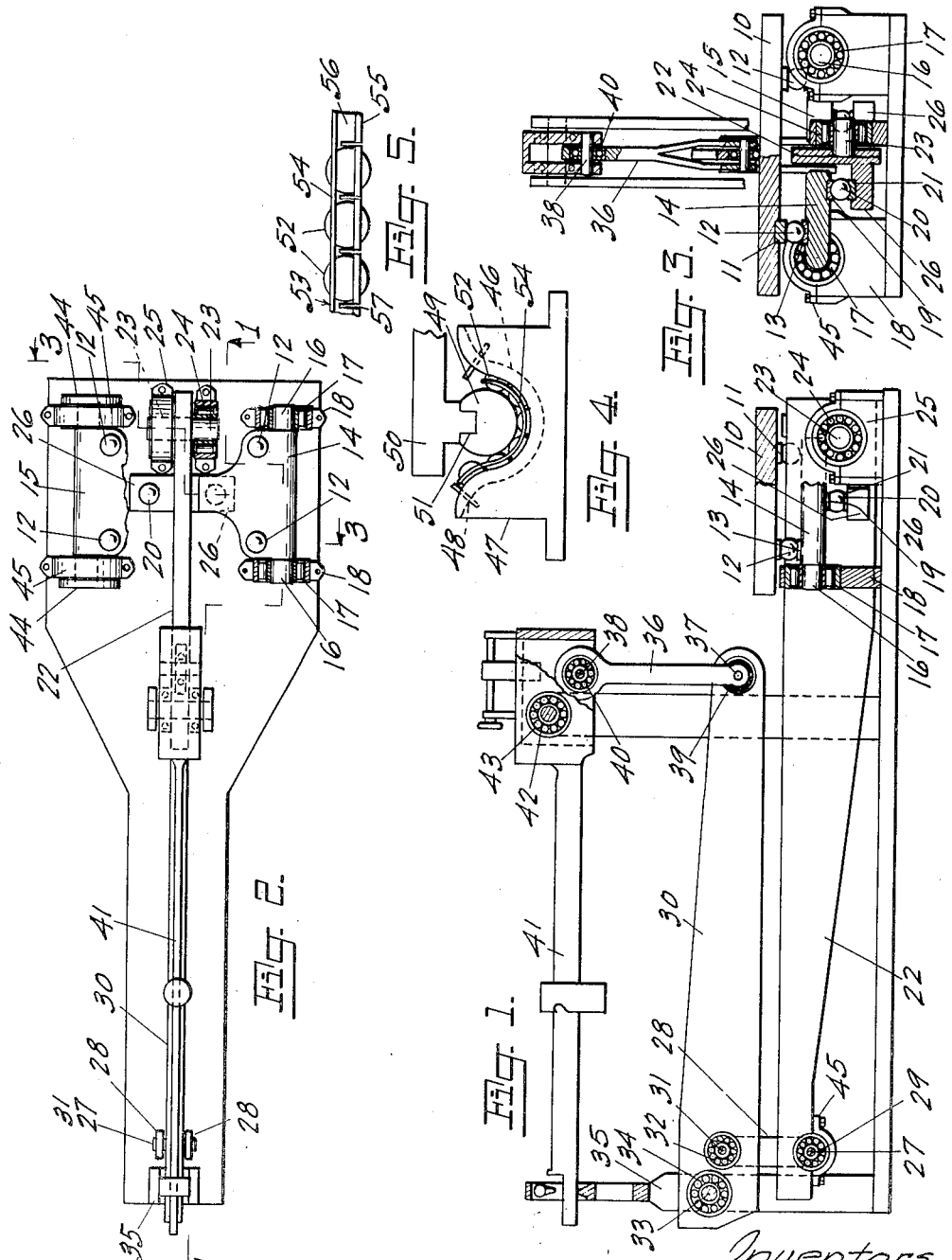

2,167,075

UNITED STATES PATENT OFFICE 2,167,075

COMPOUNDING SYSTEM AND SUSPENSION FOR WEIGHING AND TESTING MACHINES

Ivan H. Hobson, Oakland, and Clyde A. Britton, Alameda, Calif.

Application December 17, 1937, Serial No. 180,354

7 Claims. (Cl. 265—71)

This invention, a new compounding system and suspension, for weighing and testing machines, presents material advantages over present systems, due to a more rugged load-carrying and transmitting construction, overcoming the fragility of knife edges commonly used and providing for rapid and convenient replacement of parts, economy of manufacture, reduction in the number of parts, simplified construction, reduction in weight for the same capacity, compactness, greater sensitivity and accuracy, reduction or elimination of eccentric and composite stresses, and also due to the fact that the pivots and pivot bearings can be completely sealed against dust and dirt.

The main object of the invention is to provide a weighing or testing machine with ball or roller bearings as the pivoting means and to provide a special compounding system which is particularly adapted to the roller type of pivot.

Another object of the invention is to provide pivots and bearings which can be effectively sealed against ingress of dust and dirt.

A further object of the invention is to provide weight thrust transmitting means for transmitting the weight from the platform to the first compounding lever and comprising single balls located for three-point transmission and cooperating respectively two between the platform and each load lever, and one between the said each load lever and the first compounding lever.

Other objects and advantages of the invention will become apparent as the following description is read on the drawing forming a part of this specification, and in which similar reference characters are used to designate similar parts throughout the several views, of which:

Fig. 1 is a side elevation of the invention shown partly in section and taken on a line 1—1 of Fig. 2.

Fig. 2 is a top plan view of Fig. 1 with one side shown partly in section to show the inner construction.

Fig. 3 is a section taken on line 3—3 of Fig. 2.

Fig. 4 is a modified form of pivot bearing and pivot.

Fig. 5 is a fragmentary view showing a replaceable ball assembly for the bearing shown in Fig. 4.

The platform 10 is provided with a hardened socket 11 at each corner, and each of these sockets is supported on a hardened steel ball 12, and which balls rest in hardened sockets 13 mounted or formed in the load levers 14 and 15.

A cylindrical pivot 16 projects from each side at one end of each lever 14 and 15, and these pivots are supported in roller or ball bearings 17, which are supported in suitable blocks or pedestals 18. The hardened sockets 13 are formed in the top surface of the lever, and in a vertical plane parallel to the axis of the pivots located intermediate the length of the lever.

The other end of each of the load levers 14 and 15 is provided underneath with a ball socket 19 which rests on a ball 20 which in turn rests in a hardened seat 21. Thus the load on platform 10, or the weight thrust, is transmitted through the balls 12 to pivots 16 and bearings 17 at one end of levers 14 and 15, and to the ball 20 at the other end.

The first or main compounding lever 22 has a cylindrical pivot 23 extending from its opposite sides and transversely to the longitudinal axis of the lever, and the opposite ends of the pivot are supported in ball or roller bearings 24 which are supported in the pedestals 25.

A load transfer shelf or stub beam 26 projects from each side of the first compounding lever 22, in parallel relation to the axis of the pivot 23, and the respective ball seats 21 are mounted in the top of these beams, and the proportionate weight thrust is transmitted from levers 14 and 15 respectively, through the balls 20 to the respective stub beams 26 and thence to lever 22, in which the lead is divided between pivot 23 and a pivot 27 which has its opposite ends secured in the spaced straps 28, the intermediate portion of the pivot 27 being supported in ball or roller bearings 29 which are replaceably mounted in the underside of the beam. The ball seats 11, 13, 19 and 21 have a greater radius than the balls which seat therein to permit necessary movement.

From the pivot 27, the load is transmitted to the second compounding lever 30 through a pivot 31 which is secured in the upper ends of links 28, the intermediate portion of the pivot being supported in a roller or ball bearing 32 which is replaceably supported in lever 30.

One end of lever 30 is supported by a pivot 33 which in turn is supported by the ball bearings 34 which are mounted in the standards 35. A ball bearing 39 is mounted in the other end of lever 30, and a pin 37 is mounted in this ball bearing and has its ends supported in the lower end of link 36. A ball bearing 40 is mounted in the upper end of link 36 and the pivot 38 is supported in this ball bearing, the ends of the pivot 38 being supported by the scale beam 41 which is supported by the pivot 42 and ball bearings 43.

Thus the load or weight thrust is transferred from platform 10 through balls 12, to load levers 14 and 15, where the load is divided between the bearings 17 and balls 20, and the proportionate thrust transmitted through balls 20 to first compounding lever 22, where it is again divided between the ball bearings 24 and ball bearings 29, the proportionate load at 29 being transmitted through links 28 and ball bearings 32 to the second compounding lever 30, the thrust on the lever 30 being divided between the ball bearing 34 and ball bearing 39, and from bearing 39 is transmitted to the scale beam 41 through the ball bearing 40, the scale beam being supported on the ball bearing 43.

Suitable dust proof covers, as 44 are applied to all of the bearings, and, due to the removable caps 45, the bearings are readily and conveniently replaced when necessary.

A modification of the pivot bearing is shown in Figs. 4 and 5, in which a half bearing seat or race 46 is formed or mounted in a support 47 and the top of the seat flared as indicated at 48, the other race being formed by the pivot 49, and the thrust transmitting lever is fixedly secured to the pivot, as indicated by the connection of the lever 50 thereto as shown at 51.

The rollers or balls 52 for this bearing are mounted in a resilient spacer and retainer, or cage 53, which is shown as channel shaped in cross-section with holes for the upper and lower portions of the balls formed in the upper and lower legs 54 and 55 respectively, and with the lower leg 55 and web 56 split as indicated at 57 between each pair of balls to permit flexing of the cage for removal or insertion from one side or the other of the race through the flared portion 48. Thus the supporting elements may be readily replaced by merely relieving the weight on the pivot 49.

This system eliminates the double, transverse, knife edge supports at the connections between levers which are right-angularly related, and the platform transmits the weight thrust through ball or roller bearings throughout the system, which are unusually sturdy in comparison to knife edges and will withstand unusually heavy loads and shocks, and the system outlined is particularly designed for the use of such bearings.

The ball bearings, when used as outlined in this system, increase the average sensitivity of the scales over knife edges, which knife edges, irrespective of either hardness or temper, readily become dulled or chipped, and with a dull or chipped edge, the sensitivity of the scale is greatly reduced. With knife edges, the sensitivity of the scale is reduced with use, while with ball bearings, it is actually increased.

It will be understood that variations in construction and arrangement of parts, which variations are consistent with the appended claims, may be resorted to, without detracting from the spirit or scope of the invention, or sacrificing any of the advantage thereof.

We claim:

1. In a weighing device; a platform; a pair of opposed load levers having each a pivot projecting from each side at one end and a mounting for each pivot; a ball for each corner of each side of the platform and transmitting the thrust of the respective sides of said platform to the respective levers at points intermediate the ends thereof; the other ends of said levers simultaneously cooperating with the main compounding lever of the weighing device for transmission of the weight thrust to a scale beam.

2. In a weighing device; a main compounding lever having opposed pivot brackets projecting from the opposite sides thereof adjacent one end; a pivot for said one end and bearings for said pivot; a hardened ball-seat formed in the top of each bracket, and a ball disposed therein; opposed load levers transversely related to said main compounding lever and each having a ball seat formed in the undersurface at one end and supported on the respective balls; a pivot projecting from both sides of the other end of each load lever and a bearing for each end of each pivot forming a three-point suspension for each load lever, and a platform supported by said load levers intermediate the ends thereof, and having full support divided between said two load levers.

3. In a scale having a platform; a main compounding lever located intermediate the width of said platform and therebeneath and having supporting pivots at one end and bearings therefor, and a bracket projecting laterally from each side of said main compounding lever; a pair of opposed load levers respectively having a pivot support at one end on the respective brackets, and a pivot for each side of the other end and a bearing therefor; said other end having a width substantially equal to the length of said platform; said platform having a pivotal support adjacent each end of its respective sides on the respective load levers, whereby three-point load transfer is provided to the main compounding lever for each side of the platform.

4. In a weighing device having a main compounding lever having a pivot at one end and a bearing therefor; a platform; and a laterally projecting bracket on each side of said main compounding lever; two load levers in opposition and having each a pivot support at one end and supported respectively on the respective brackets and having coaxial pivots projecting from the opposite sides of the other end, and bearings therefor, providing a three-point support for each load lever, and a pivot cooperating between each of the opposite ends of each side of said platform respectively with the respective load levers, forming three-point load transfers to said main compounding lever from each side of said platform.

5. In a weighing device having a platform; a base; and a main compounding lever; two load levers oppositely disposed and each having three-point support between said main compounding lever and said base; a pivotal support for each end of each side of said platform; the supports for the respective sides of said platform cooperating with the respective load levers forming a three-point load transfer between each side of said platform and said main compounding lever.

6. A structure as claimed in claim 5; a scale beam; and a system of compounding levers transferring weight thrust from said main compounding lever to said scale beam; said scale beam and all of said levers with the exception of said load levers, being located in the same vertical plane for direct, non-transverse transfer of weight through the system of levers and beam.

7. Weight-thrust transfer means for transferring the thrust created by a load, to a main, or first compounding lever, comprising two load levers each having a pivot extending from opposite sides at one end, and a bearing for each pivot; a ball seat formed in the undersurface adjacent the other end of said load lever, and intermediately related to said pivots, and two spaced ball seats formed parallel with the axis of said pivot and spaced to coincidently support both ends of one side of a platform and located in the top surface intermediate the ends of said levers; a ball for each ball seat for respectively supporting the other ends of said load levers and transmitting the weight thrust to said first compounding lever from the four corners of said platform supported completely by said two load levers.

IVAN H. HOBSON.
CLYDE A. BRITTON.